L. P. KEECH.

Paper-Files.

No. 5,025. Reissued Aug. 6, 1872.

Chas. H. Smith
Geo. D. Walker
Witnesses.

INVENTOR.
Lawson P. Keech,
Per. Lemuel W. Serrell
ATTY.

THE NORRIS PETERS CO., WASHINGTON, D. C.

UNITED STATES PATENT OFFICE.

LAWSON P. KEECH, OF NEW YORK, N. Y., ASSIGNOR TO JOHN B. SMITH AND ELLEN P. KEECH.

IMPROVEMENT IN PAPER-FILES.

Specification forming part of Letters Patent No. 124,961, dated March 26, 1872; reissue No. 5,025, dated August 6, 1872.

*To all whom it may concern:*

Be it known that I, LAWSON P. KEECH, of the city and State of New York, (formerly of Washington, D. C.,) have invented an Improvement in Paper-Files; and the following is declared to be a correct description of the same.

This improved paper-file is adapted to receive letters, papers, or other sheets that are to be preserved and formed into a book, when such sheets have accumulated sufficiently. I make use of slats that are notched for the reception of contractile rubber bands or cords, one near each end; and in such slats there are longitudinal mortises or openings, so that cords, tapes, or wires may be applied at these points to bind the sheets together in book form, for removal from the paper-file, in order that the latter may again be used. I also provide sheets of paper intervening between the slats, and notched at the end to correspond with such slats; and these sheets may be made as an index for classifying the letters or other papers. Covers may also be provided, connected to such slats by flexible material. A sheet-metal clamp is employed to receive the edge of the sheet that is to be inserted in the paper-file.

Figure 1:
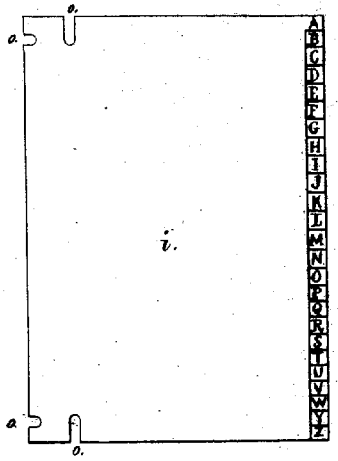
Figure 3:
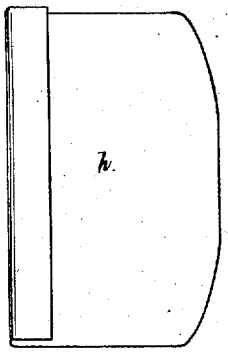
Figure 2:
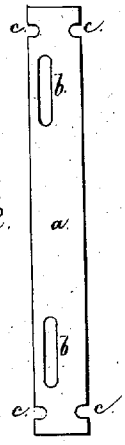

In the drawing, Fig. 1 represents the sheets to be introduced between the slats shown in Fig. 2. Fig. 3 shows the sheet-metal clamp; and Fig. 4 is a perspective view of the book-cover and file complete.

Figure 4:
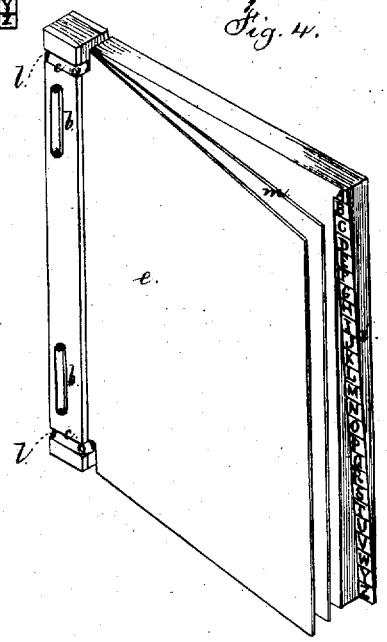

The slats *a a* are of the required size and material, and made with longitudinal mortises *b b*, as seen in Figs. 2 and 4, and with notches at *c c* for the reception of the bands, cords, straps, or springs *l* that hold the slats together and secure the intervening sheets. The sheets *i*, that are employed between the slats *a a* for filing letters and assorting them by the use of an alphabet or index, are shown in Figs. 1 and 4. The sheets are to be separate, and each one provided with notches at *o o*, corresponding with the end of the slat, so that the sheets are held properly in place by the cords or bands *l*.

The said sheets *i* may be used with the slats *a* without any cover, but when covers *e* are employed they are attached, by flexible material, to the said slats *a*, and made with notches or slots between the cover and slat into which the bands *l* pass.

The sheet-metal clamp *h*, shown in Fig 3, is made with one edge folded over, so that the edge of the letter or paper can be placed therein, and carried back into its place between the clamps, and then the letter or paper can be held to the adjacent sheets while the clamp is removed by pressing it out through the back of the book. The sheet of paper *m*, next to the file-cover, will form the book-cover when the book is bound, by inserting tape, cord, or wire through the sheets at the mortises *b b*.

The notches *c c* may be varied to suit the kind of band, cord, or strap employed to hold the slats together.

By this construction of paper-file the back corners of the sheets are retained, so that the sheets cannot become displaced, and at the same time they can be parted for the insertion of letters, papers, &c.

I claim as my invention—

1. The slats *a* and covers *e*, connected together, and made with notches *c* in the slats *a*, for the reception of the elastic bands *l*, and slots between the cover and slats, into which said bands *l* pass, substantially as set forth.

2. The paper-file, composed of the sheets *i*, notched at *o o* to correspond with the slats *a a*, and be secured by the bands *l*, substantially as set forth.

3. The sheet-metal clamp *h*, with a folded edge for receiving and inserting papers into the file, substantially as and for the purposes set forth.

Signed by me this 13th day of May, A. D. 1872.

LAWSON P. KEECH.

Witnesses:
GEO. T. PINCKNEY,
CHAS. H. SMITH.